July 24, 1934.  J. WHYTE  1,967,698

AUTOMATIC BRAKE CONTROL

Original Filed July 22, 1929  4 Sheets-Sheet 1

Inventor
John Whyte
By Churdahl Parker Carlson
Attys

July 24, 1934.  J. WHYTE  1,967,698
AUTOMATIC BRAKE CONTROL
Original Filed July 22, 1929  4 Sheets-Sheet 3
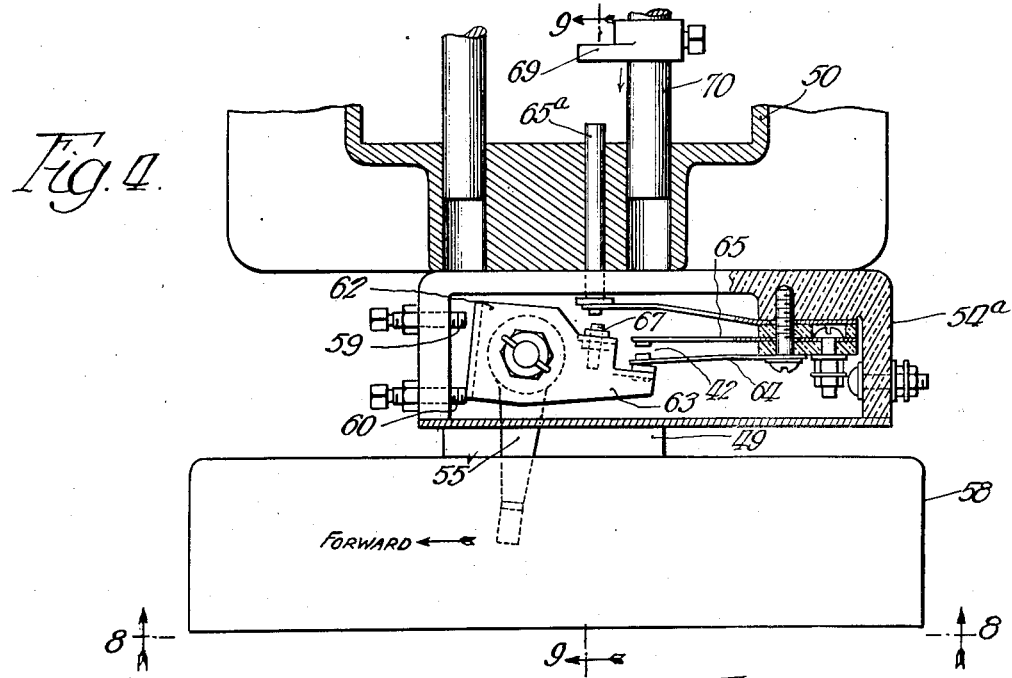
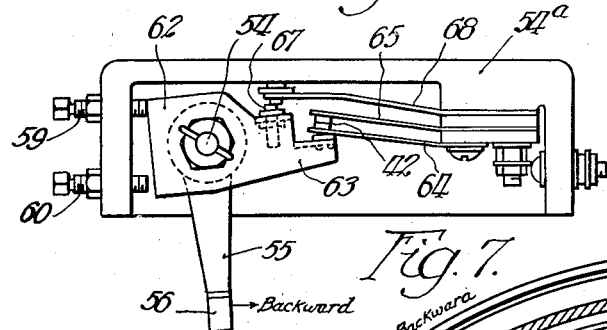
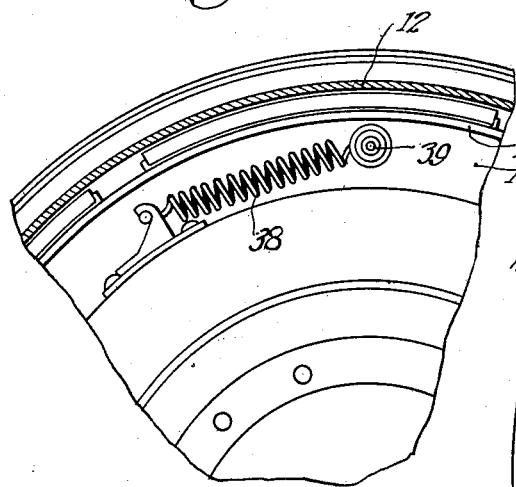
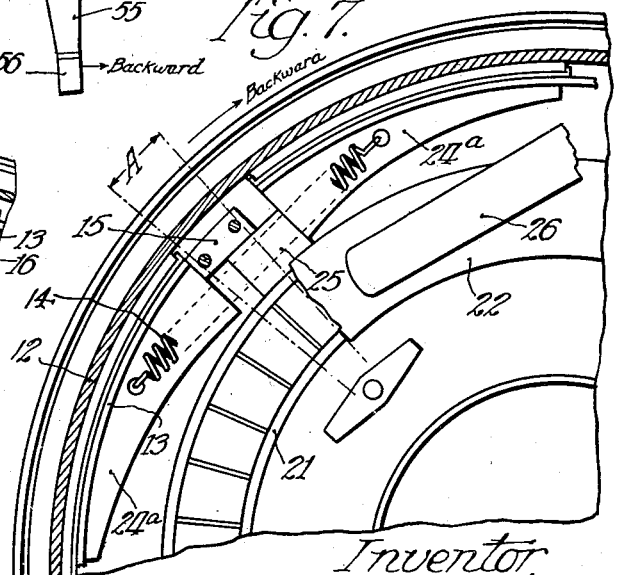
Inventor
John Whyte July 24, 1934.　　　　　J. WHYTE　　　　　1,967,698
AUTOMATIC BRAKE CONTROL
Original Filed July 22, 1929　　　4 Sheets-Sheet 4
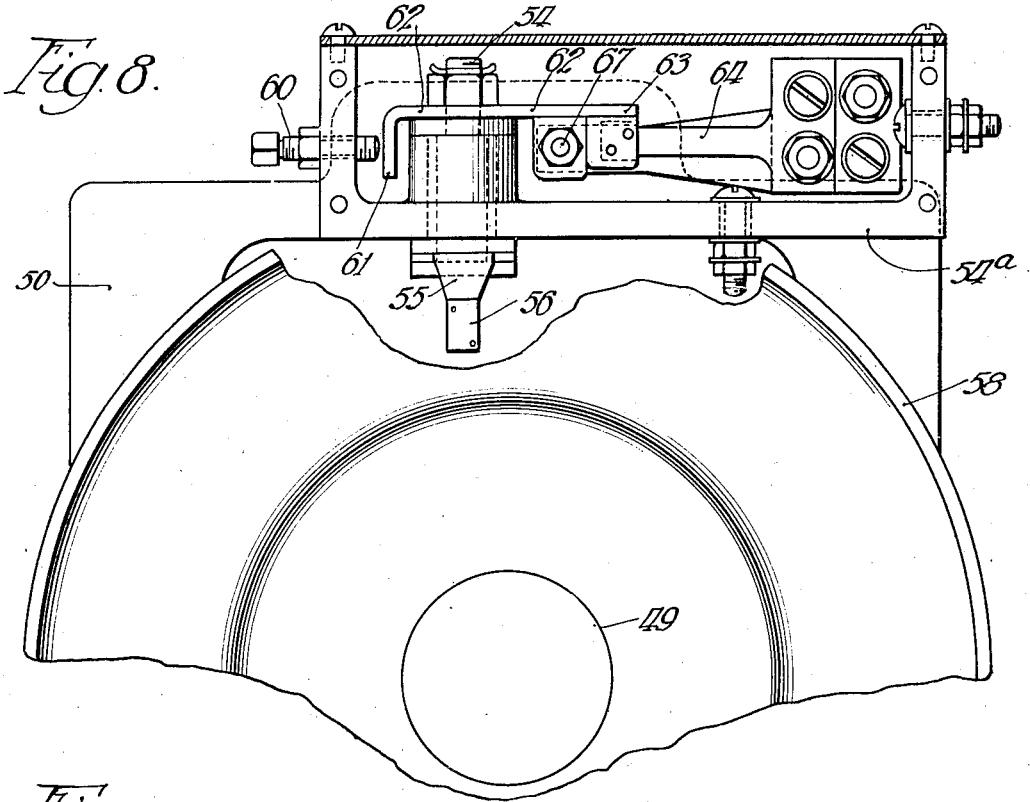
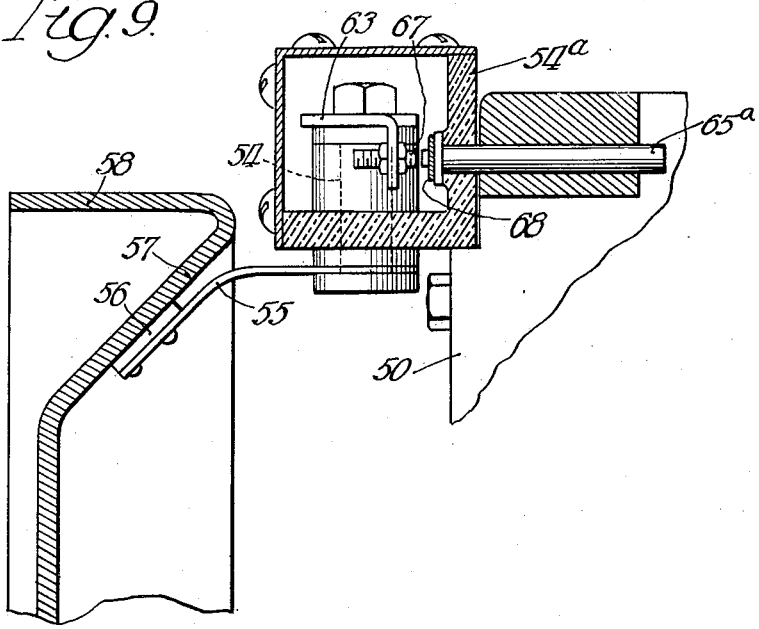
Inventor
John Whyte Patented July 24, 1934

1,967,698

UNITED STATES PATENT OFFICE 1,967,698

AUTOMATIC BRAKE CONTROL

John Whyte, Beloit, Wis., assignor to Warner Electric Brake Corporation, South Beloit, Ill., a corporation of Illinois Application July 22, 1929, Serial No. 379,900
Renewed December 29, 1933

38 Claims. (Cl. 192—4)

This invention relates to means for controlling a retarding device on an automotive vehicle to prevent unintentional retrograde motion of the vehicle and has more particular reference to the automatic control of a vehicle brake whose operation is governed by electromagnetic action.

The principal object of the invention is to provide a new and improved control means for an electromagnetic vehicle brake which operates entirely automatically both in governing the application of the brake when the vehicle rolls backward against the will of the driver and in effecting release of the brake when motive power is applied to the vehicle to move it forwardly. In the attainment of this object, the braking action is controlled by means which responds to backward rolling movement of the vehicle and which functions, in the release of the brake, to detect the application of motive power in a direction to drive the vehicle forwardly.

A further object is to provide a brake controlling means of the above general character which is particularly adapted for use with a brake operator of the so-called momentum type, that is to say, an operator in which an actuating force is derived from the momentum of the vehicle by the gripping engagement of two friction elements, the driven element being adapted to move along with the driving element and thereby apply the actuating force to a primary braking means.

The invention also aims to provide a brake controlling device for detecting movement of the vehicle, which device is novel and simple in construction, reliable in operation under all of the various conditions encountered in the control of automobile brakes and conveniently located on the vehicle so that many of the parts normally provided on such vehicles may be utilized.

Another object is to provide, in combination with a brake control device of the above general character, novel means for rendering said device ineffectual when it is desired to propel the vehicle rearwardly under its own motive power.

Still another object is to provide means for automatically controlling an electric retarding device in the manner above described together with a novel means for rendering said control means ineffectual when the vehicle is not in use, that is, parked for a substantial interval of time under conditions which would normally render the automatic control effective in applying the brake.

Other objects and advantages of the invention will become apparent from the following detailed description taken in connection with the accompanying drawings, in which Figure 1 is a plan view of the chassis of an automotive vehicle equipped with a braking system embodying the features of the present invention.

Fig. 4 is a sectional view of the transmission gear housing of the vehicle and one of the control devices used in the present system.

Fig. 5 is a plan view of the control device showing a different position thereof.

Fig. 6 is a fragmentary sectional view of a part of the brake shown in Fig. 2.

Fig. 7 is a sectional view taken along the line 7—7 of Fig. 2.

Figure 1:
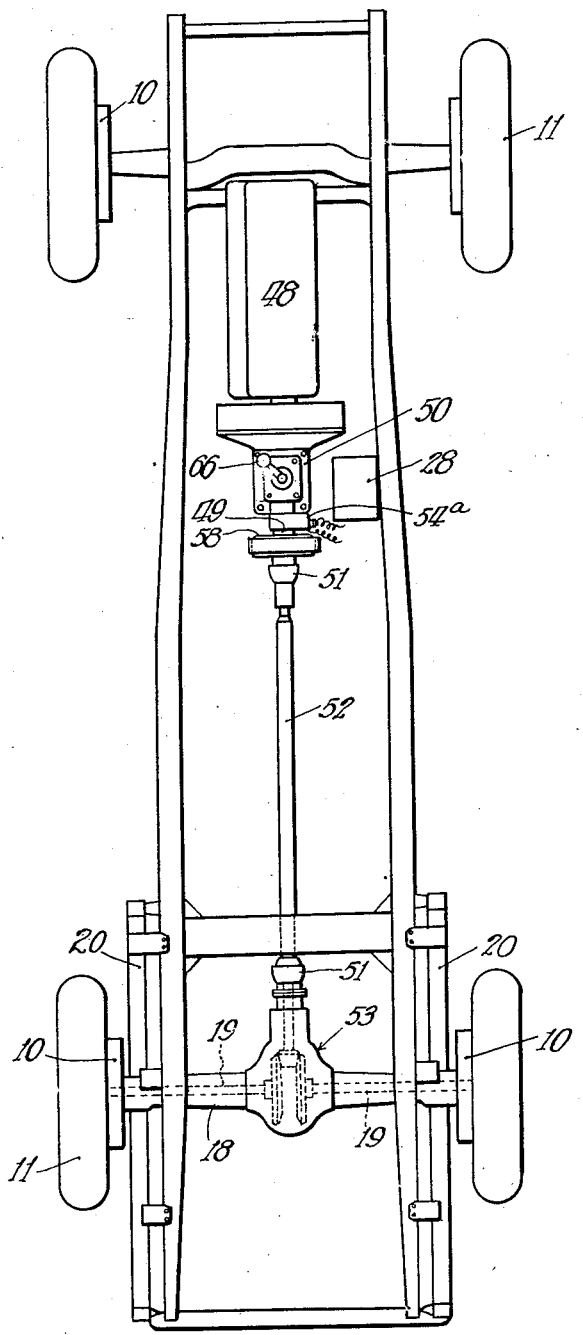

Figs. 8 and 9 are sectional views taken respectively along lines 8—8 and 9—9 of Fig. 4.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In the exemplary form shown in the drawings, the invention is arranged to control the operation of a retarding means on a self-propelled automotive vehicle, being utilized more particularly in the auxiliary regulation of one or more of the driver-controlled service brakes of such vehicles. According to modern practice such a vehicle braking system embodies a separate brake unit 10 for each of the vehicle wheels 11.

Figure 2:
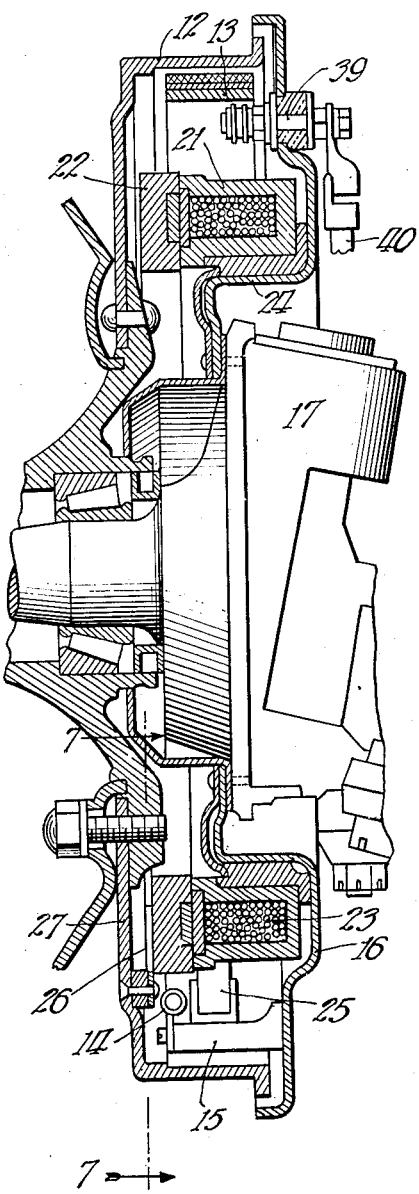
Fig. 2 is a fragmentary sectional view of a vehicle wheel equipped with a brake adapted for use with the present control system.

Each brake unit, shown herein by way of illustration, comprises a drum 12 (Fig. 2) rotatable with a wheel 11 and a flexible friction band 13 extends around the inner drum surface with its adjacent end terminating on opposite sides of and urged by a spring 14 (Fig. 2) toward a fixed stop 15 which serves as an anchor for the band (Fig. 7). The stop is rigid with a non-rotatable plate 16 closing the open end of the drum, which plate, in the case of the front wheel brakes, is secured to the steering knuckle 17 as shown in Fig. 2. In the case of the brakes for the rear wheels, the plates 16 are similarly secured to the ends of the housing 18 for the rear driving axles 19. Angular movement of this housing is resisted by the rear springs 20 which are usually interposed between the housing and the chassis frame.

Brakes of the above character are particularly adapted for actuation by an electromagnetically controlled operator incorporated in the brake structure and capable of deriving an actuating force of varying magnitude from the momentum of the vehicle. In the present instance, the momentum operator comprises a pair of magnetic friction elements in the form of rings 21 and 22 adapted to be brought into axial gripping engagement by the energization of a winding 23 enclosed by the ring 21 which thereby constitutes an electromagnet. This ring is mounted on a flange 24 for oscillation about the drum axis and has rigid therewith an outwardly projecting lug 25 disposed between brackets 24ª on the adjacent ends of the band 13. The lug is thus adapted to move one or the other end of said band away from the stop 15 when the ring 21 is moved in either direction away from brake-released position in which the ring is normally maintained by the action of the spring 14.

The ring 22, which constitutes the armature of the magnet, rotates with the drum 12 and herein is floatingly supported and urged into continuous mechanical contact with the friction surface of the magnet by a plurality of tangentially extending metal strips 26, each secured at one end to the drum flange 27 and at the other end against the back of the armature ring 22.

Each brake is applied as follows, assuming that its wheel 11 is rotating in a direction to move the vehicle forwardly as indicated by the arrow and legend in Fig. 7. Upon energization of the winding 23, a magnetic flux will thread the closed metallic circuit through the armature ring 21 and the magnet core 22, producing gripping engagement of the friction surfaces of the two rings which causes the magnet ring to move away from brake-released position in the direction of rotation of the wheel and with a force proportional to the strength of the energizing current. In this movement, the lug 25 moves one end of the band away from the stop 15 thereby expanding the band against the drum. When the clearance between the band and the drum surfaces has been taken up, slippage takes place at the gripping surfaces of the two rings, the ring 21 remaining stationary and maintaining the brake set with a force determined by the current flowing in the winding 23. Upon deenergization of the winding, the actuated end of the band and also the magnet ring 21 are restored to brake-released position by the spring 14.

A similar action occurs upon energization of the magnet when the vehicle is moving backwardly, except that the other end of the band, as shown in Fig. 7, is moved away from the stop 15. When the brake is thus applied, further backward rotation of the wheel is resisted, but the wheel is free to rotate through a very slight angle in a forward direction even though the winding remains energized. This is due to the inherent nature of brake operators of the present type whose action results from motion of the vehicle.

The current for energizing the magnets for the different brakes may be derived from the usual storage battery 28 or other suitable source of supply, and the strength of such current may be regulated to effect normal braking operations by means such as a manually controllable rheostat 29. In the form herein shown, the rheostat comprises a plurality of parallel resistance elements 30 common to a buss bar 31 and connected to individually spaced spring strips 32 which are engaged successively by a contactor plate 33 whose curved surface is brought into abutting engagement with the curved ends of the strips 32 by depression of a foot pedal 34. The latter is connected to the free end of a swingable crank arm 35 which carries the contactor plate. An auxiliary strip 36 is engaged in the initial movement of the pedal and this strip, together with a conductor 37, connects the contactor plate to one terminal of the storage battery. The other battery terminal may be grounded to the chassis frame of the vehicle.

Preferably, the windings 23 for the different brake magnets are interposed in parallel relation between the grounded battery terminal and the buss bar 31. For this purpose, one of their terminal ends is grounded to their core 21. The insulated end of each winding is electrically connected to one end of a resiliently extensible and contractible coil 38 (Fig. 6), whose other end is secured to a stationary binding post 39 supported by and projecting through the anchor plate 16 and connected to the buss bar 31 by means including a cable conductor 40 supported by the chassis structure. It will thus be seen that by depressing the pedal 34 varying distances, the energizing circuit for the brake magnets will be closed and the strength of the current flowing therethrough regulated to give the desired degree of braking action.

The present invention, when associated with a primary braking system of the above general character, contemplates the provision of an auxiliary energizing circuit for one or more of the magnet windings 23 combined with means which functions automatically, first, to close the auxiliary circuit when the vehicle rolls backwardly under its own momentum or the action of gravity; second, to open the said circuit when motive power is again applied to drive the vehicle forwardly; third, to maintain the circuit open when the vehicle is intentionally driven backwardly; and fourth, to hold the circuit open when the vehicle is not in use. For the sake of simplicity, all of the windings 23 are herein included in the auxiliary circuit which extends from the buss bar 31 through a conductor 41, a switch 42, a conductor 43, an adjustable rheostat 44, a conductor 45, a switch 46, and a conductor 47 to the non-grounded terminal of the battery 28. The rheostat 44 may be adjusted to give any desired degree of braking action when the brakes are automatically applied. The functions above referred to are performed by mechanism controlling the opening and closing of the switches 42 and 46 and these functions will now be considered separately.

To apply the brakes automatically, when the vehicle moves backwardly down an inclined roadway against the driver's intention, means is provided to detect such reverse movement of the vehicle and to close the switch 42 in response thereto. For a purpose which will later appear, this means is preferably associated with the forward end of the rotary connection through which power from the vehicle motor 48 is transmitted to the drive wheels. Herein this connection includes a stub shaft 49 projecting rearwardly from a casing 50 housing the usual speed-change gearing (not shown) and connected by universal couplings 51 and a shaft 52 to the driver of a differential gearing 53, the terminal gears of which are on the axles 19 for driving the rear wheels. Generally stated, the detecting means comprises a device arranged to be driven frictionally from a surface which rotates with the propeller shaft and having a limited range of movement so as to be moved in one direction upon the initial movement of the shaft in a direction to move the car forwardly and in the opposite direction upon the initial movement of the shaft in a direction to move the vehicle rearwardly.

As shown particularly in Figs. 4, 5 and 8, the device above referred to is in the form of a bell-crank lever including a vertical stud 54 extending through and journaled in the lower wall of a casing 54ª composed of insulating material and secured to the rear wall of the gear box 50. Rigid with the lower end of the stud 54 and projecting rearwardly in a direction longitudinally of the vehicle is an arm 55 carrying a pad 56 of wear-resisting material which, in the embodiment shown, is maintained continuously in light frictional contact with an annular surface 57 (Fig. 9) which rotates with the power shaft 49 and preferably is of a diameter somewhat larger than said shaft. The drum 58 of the so-called emergency or transmission brake, usually mounted on the stub shaft 49 immediately behind the transmission gear box, provides a friction surface suitable for this purpose.

The arm 55 is thus adapted to be swung laterally in the rotation of the propeller shaft in opposite directions, such movement being limited by the two adjustable stops formed by screws 59 and 60 threading through the casing 54ª and adapted to be engaged by a flange 61 on a plate 62 which is disposed within the casing and made rigid with the upper end of the stud 54.

Projecting from the plate 62 in a direction transversely of the vehicle is an arm 63 adapted, by a forward swinging movement from the position shown in Fig. 4, to engage a spring arm 64 and carry a contact thereon into engagement with a contact on a second spring arm 65, which contacts form the switch 42. At their other ends, the spring arms 64 and 65 are secured to the casing 54ª and are connected respectively to binding posts to which the conductors 41 and 43 of the auxiliary circuit are attached. The spring arms are so spaced and tensioned that they will spread apart automatically and thereby open the switch 42 when the bell crank arm 63 is moved to its rearmost position shown in Figs. 3 and 4.

In the automatic application of the brakes, the detecting means above described operates as follows, it being first assumed that the switch 46 is closed and that the vehicle is moving forwardly. Under these conditions, the power shaft 49 rotates in a direction indicated by the legend in Fig. 4, and the frictional force thus applied to the arm 55 holds the bell-crank against the stop 60 thereby maintaining the switch 42 open.

Supposing now that the vehicle comes to a stop on an up-grade and that the driver does not depress the service brake pedal 34 thereby permitting the vehicle to roll backwardly by the action of gravity. The initial reverse rotation of the rear wheels is transmitted to the propeller shaft through the differential 53 and augmented thereby so that the shaft moves through a correspondingly greater angle than the wheel. In the initial angular movement, the surface 57 exerts a frictional force on the arm 55 carrying the latter to the right as viewed in Fig. 5 until the motion of the bell-crank is arrested by the stop 59. The arm 63 is thus moved forwardly and in its initial movement engages the rear spring arm 64 carrying its contact against the coacting contact thereby closing the switch 42. This completes the energizing circuit through the brake windings which applies all of the four-wheel brakes by moving their actuating lugs into the position indicated in Fig. 7. Further, backward movement of the vehicle is thus arrested.

By actuating the bell crank lever from a friction surface of relatively large diameter and through the medium of the differential gearing 53, the means for detecting backward movement of the vehicle is rendered extremely sensitive. In fact, the degree of angular movement of the rear wheels which is required to close the energizing circuit is so extremely small that the application of the brakes is hardly noticeable to the occupants of the vehicle.

In arresting the backward movement of the vehicle in the manner above described, there is some potential energy stored in the vehicle springs, particularly in the rear springs 20 which become flexed slightly in resisting the twisting of the housing 18 which results from application of the rear brakes when the vehicle is moving rearwardly. After the backward motion has been arrested, this energy acts to tip the housing 18 and the rear axles 19 forwardly into normal position which causes a slight angular motion of the shaft 49 in a reverse direction, that is, in a direction corresponding to a forward motion of the vehicle. A similar angular motion of the propeller shaft would be produced by the forward throw of the vehicle body after the backward movement has been arrested by the use of the front wheel brakes only. Such angular motion of the propeller shaft, although of very small magnitude, moves the bell-crank arm 63 in a direction to allow the switch 42 to open which, if allowed to occur, would release the brakes allowing a further backward movement of the vehicle before the brakes again become set.

To prevent release of the brakes under these conditions, the switch 42 is maintained closed during the slight angular motion of the propeller shaft above referred to. This is accomplished in the present instance by providing a floating mounting for the contacts which form the switch 42 and positioning the stop 59 so as to allow for a movement of the bell crank arm 63 which is in excess of that required to bring the contacts into engagement. That is to say, the additional deflection of the contact arms 64 and 65 in the movement of the bell crank into the position shown in Fig. 5 exceeds the reverse movement which would result from the above mentioned angular movement of the propeller shaft. As a result the brakes when once applied by closure of the switch 42, remain set until the vehicle is driven forwardly or the control circuit intentionally broken by the driver.

Considering now the manner in which the brakes are released, the same means which detects reverse movement of the vehicle may be utilized to open the switch 42 automatically inasmuch as the bell-crank and its associated mechanism, when located as above described, are adapted to perform the additional function of detecting the application of motive power to the vehicle in a direction to drive the vehicle forwardly. Thus when the running motor 48 is connected to the propeller shaft through the medium of the transmission gearing, a torque is applied to the stub shaft 49 which takes up the back-lash in the differential gearing, the slack in the universal couplings 51, and applies a torsional stress to the rear axles 19. In view of the length of and the inherent looseness in the operating connections between the transmission gearing and the rear wheels, the forward end of the propeller shaft moves through a small angle before the motive power is actually applied to the rear wheels. Such independent angular motion of the propeller shaft, particularly when applied to the lever arm 63 at such a large radius and through the gearing 53, may move the bell-crank a distance sufficient to allow the switch 42 to open thereby interrupting the auxiliary energizing circuit. The brakes are thus released automatically without moving the vehicle against the retarding action of the brakes. Thus, the vehicle may be started forwardly on an up-grade with the same degree of smoothness that may be obtained when starting on a level roadway.

It will be apparent that such effectual and automatic release of the brakes is attained by allowing, while the brake magnets remain energized, for a certain degree of independent movement of the driving friction surface 57 by power applied in a direction to move the vehicle forwardly. Such independent movement results first, from the normal play in the driving connections as above explained and secondly, the inherent characteristics of brake operators of the momentum type. Such operators derive their actuating forces from the motion of the vehicle and therefore allow for a slight forward movement of the vehicle while the magnets remain energized after arresting backward movement of the vehicle. This will be apparent from an examination of Fig. 7 which shows the brake after having been set by backward motion of the vehicle, the wheel being free to rotate forwardly through an angle A, even though the magnet remains energized. This is due to the fact that the direction of motion of the vehicle wheel determines the action of the momentum operator whose driven element, that is the ring 21, moves through a small angle in taking up the normal clearance and wear between the coacting surfaces of the brake during each application of the brake. While either the play in the driving connections or the movement allowed by the momentum operators provides for sufficient angular motion of the propeller shaft to cause deenergization of the brake magnets when power is applied to said shaft, both of these factors contribute to this end in the present instance. Such a wide range of movement allows for greater tolerances in and a more rugged construction of the switch actuating mechanism above described.

In order to prevent application of the brakes when the vehicle is intentionally driven rearwardly, means is provided for maintaining the auxiliary circuit interrupted when the vehicle is conditioned for self-propulsion backwardly. The gear shift lever 66 (Fig. 3) may be utilized as such a circuit breaking means since, in modern automotive vehicles, it controls the application of motive power to the vehicle in a direction to move the vehicle rearwardly. In the present instance, the lever is mechanically associated with the actuator for the switch 42 through the medium of an endwise movable rod 65ᵃ projecting rearwardly from the rear wall of the gear casing 50 and adapted for engagement with a forwardly facing adjustable abutment 67 on the arm 63. A spring 68 acts on the outer end of the rod to urge it forwardly into the casing so as to permit normal movement of the arm 63 into the position shown in Fig. 5.

Figure 3:
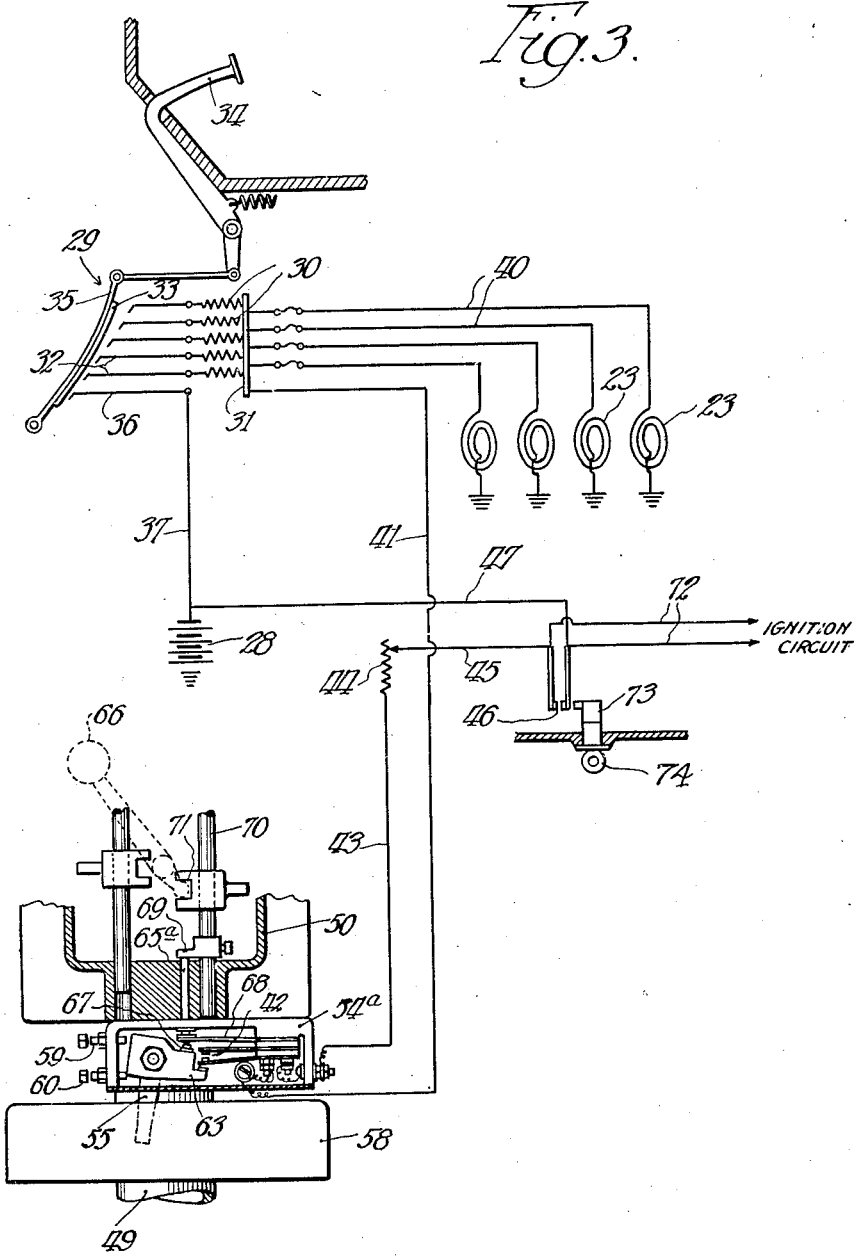
Fig. 3 is a schematic view and wiring diagram of the brake control system.

The inner end of the rod 65ᵃ is positioned in the path of a lug 69 projecting laterally from the slide 70 which, in standard transmission gearings, is arranged to be shifted rearwardly into the position shown in Fig. 3 when the lever 66 is moved into "reverse" position, that is, thrown to the left to bring its lower end into the socket 71 and then moved forwardly as shown in Fig. 3. When the slide 70 is thus projected rearwardly, the lug 69 strikes the rod 65ᵃ moving it rearwardly into obstructing position immediately in advance of the abutment 67, thereby locking the bell crank arm 63 against movement by the friction surface 57 when the motive power is actually applied to move the vehicle rearwardly. In the event that the brakes were applied by retrograde motion of the vehicle prior to the shifting of the lever 66, the circuit will be interrupted and the brakes released by such shifting inasmuch as the movement of the lever 66 readily overcomes the frictional force then tending to hold the bell-crank in circuit-closing position.

It will be apparent that by locating the switch 42 and its operating mechanism adjacent the transmission gear box 50, a simple and inexpensive means is provided for rendering the automatic control ineffectual when it is desired to propel the vehicle rearwardly.

The control of the auxiliary braking action by the shift lever 66 may be utilized to advantage in arresting the motion of the vehicle while the same is rolling rearwardly under the momentum acquired in backing the vehicle by its own motive power. Under such conditions, it is customary with present-day vehicles for the driver to apply the manually controlled service brake before starting forwardly. With the arrangement above described, it is merely necessary to throw the shift lever 66 out of "reverse" position which is ordinarily done preparatory to driving the vehicle forwardly. Such movement of the lever allows the rod 65ᵃ to slide forwardly thereby rendering the reverse movement detecting means effective with the result that the brakes are applied without effort on the part of the driver.

In view of the fact that the circuit for controlling the brakes to arrest retrograde motion is governed by means not within the vehicle driver's control and utilizes current from the storage battery, it is desirable to avoid unnecessary burdening of the battery, when, for example, the vehicle is parked for a long period of time under conditions which would ordinarily cause the auxiliary circuit to be closed. Preferably this is accomplished by interrupting the auxiliary circuit automatically by means which is normally operated by the vehicle driver as an incident to stopping of the vehicle for parking. In the present instance, this means includes the switch 46 which renders the motor 48 of the vehicle operative or inoperative. In the case of internal combustion motors, this switch is interposed between conductors 72 in the ignition circuit as indicated in Fig. 3, which circuit is in parallel with the auxiliary brake circuit. The ignition switch is ordinarily located within the driver's reach and adapted to be actuated by a locking member 73 controlled by a key 74.

Since the switch 46 is opened by the vehicle driver in the act of parking the vehicle, it will be apparent that the actuator for this switch affords a convenient and efficient means for preventing energization of the auxiliary brake circuit under conditions where the commonly provided emergency brake may be used to maintain the position of the vehicle on an incline. Such control is also advantageous in that it does not interfere with the proper movement of the vehicle in shipment or in storage as is often necessary.

From the foregoing, it will be apparent that the present braking system provides for optimum safety in the operation of modern automotive vehicles, facilitates handling of such vehicles, is positive and reliable and meets all of the conditions to be encountered in driving automotive vehicles in modern traffic. The system as a whole is inexpensive to manufacture because a single braking means is employed both for manual and automatic control and the power operator lends itself readily to either of such controls. The automatic control mechanism is rendered extremely simple by the utilization of many parts now provided on modern automotive vehicles.

I claim as my invention:

1. In an automotive vehicle having a driving motor and a shaft for connecting said motor to a drive wheel of the vehicle, the combination of an electric brake, a switch controlling energization and deenergization of said brake, an oscillatory member controlling the opening and closing of said switch and having an arm extending in a direction substantially parallel to said shaft, an annular surface which rotates with said shaft and arranged for frictional engagement with said arm, and means for limiting the movement of said arm in opposite directions, said switch being closed when said arm is at the limit of its movement in one direction.

2. In an automotive vehicle having a driving motor and a shaft for connecting said motor to a drive wheel of the vehicle, the combination of an electric brake, a switch controlling energization and deenergization of said brake, an oscillatory member controlling the opening and closing of said switch, means rotatable with said shaft and providing an annular friction surface of a diameter substantially greater than said shaft, said surface being arranged for frictional engagement with said member whereby to move the member into one position upon backward movement of the vehicle and to move the member in the opposite direction when motive power is applied to said shaft in a direction to move the vehicle forwardly.

3. An electric braking system for preventing retrograde motion of an automotive vehicle having a power shaft operatively connected to one of the vehicle wheels, said system comprising, in combination, retarding means for arresting the motion of the vehicle, electromagnetic means controlling the action of said retarding means, a circuit for energizing said electromagnetic means including a switch, a device driven frictionally from said power shaft and arranged to close said switch automatically upon rotation of said shaft by retrograde motion of said vehicle, said device having a range of movement greater than that required to close said switch.

4. An electric braking system for an automotive vehicle having a motor and a rotary driving connection for transmitting the power of the motor to one of the vehicle wheels, an electromagnetic brake adapted when energized to exert a retarding action on the vehicle, an energizing circuit for said brake including a switch adapted to be closed to apply the brake, said switch being formed by two flexibly supported contacts, a device driven frictionally from a part rotatable with said connection and having a limited range of movement, said device upon being actuated by retrograde motion of said vehicle acting to move one of said contacts into engagement with the other contact and then to move both of the contacts an additional distance whereby to prevent opening of said switch upon the initial reverse movement of said rotary part.

5. An electric braking system for an automotive vehicle having a motor and a rotary driving connection for transmitting the power of the motor to one of the vehicle wheels, an electromagnetic brake adapted when energized to exert a retarding action on the vehicle, an energizing circuit for said brake, and means actuated from a part rotatable with said connection to close said circuit upon retrograde motion of the vehicle and to maintain said switch closed for a predetermined range of reverse movement of said connection whereby to hold the brake applied during the rotation of the connection caused by the potential energy stored in the vehicle springs in arresting backward movement of the vehicle.

6. An electric braking system for an automotive vehicle having a motor and a connection for transmitting the power of said motor to a wheel of the vehicle including a rotary member, an electromagnetic brake adapted when energized to exert a retarding action on the vehicle, means driven frictionally from said rotary member and acting upon rotation of the member by retrograde motion of the vehicle to energize said brake and upon the reverse movement of said member to deenergize said brake only after said member has traversed a predetermined angular distance.

7. In combination with a self-propelled automotive vehicle having a device arranged to be moved by the vehicle driver into one position to condition the vehicle for operation under its own motive power and to be moved out of said position to prevent such operation, electromagnetically controlled retarding means operable automatically to arrest retrograde motion of the vehicle when said device is in said first mentioned position and arranged to be rendered inoperative by movement of said device out of said position.

8. In an automotive vehicle having a driving motor, the combination of a device adapted for selective manual operation to render said motor operative or inoperative, and electrically controlled retarding means operable automatically to arrest unintentional retrograde motion of the vehicle and adapted to be rendered ineffectual automatically as an incident to the manipulation of said device in rendering said motor inoperative.

9. In an automotive vehicle having a driving motor, the combination of a manually operable electric switch arranged to govern the operation of said motor, means for retarding backward motion of said vehicle, electromagnetic means arranged to govern the automatic actuation of said retarding means, and means including said switch for controlling an energizing circuit for said electromagnetic means.

10. In an automotive vehicle, the combination of braking means, control means for said braking means governed automatically by retrograde motion of said vehicle, and means adapted to render said control means ineffectual including a device arranged to be manipulated by the driver of the vehicle as an incident to the stopping of the vehicle for parking thereof.

11. In an automotive vehicle, the combination of a brake for arresting the motion of said vehicle, electromagnetic means controlling the operation of said brake, means providing an energizing circuit for said electromagnetic means including a switch which is normally closed by the vehicle driver in the act of conditioning the vehicle for operation, and a second switch adapted to be closed automatically as an incident to the movement of the vehicle rearwardly.

12. An electric braking system for a vehicle having a driving wheel and a motor having some degree of angular motion relative to said wheel by reason of the play in the connection between said motor and said wheel, said system comprising a brake arranged to exert a retarding force on a part of said vehicle which rotates in opposite directions during backward and forward movement of said vehicle, electromagnetic means adapted when energized to apply said brake, and a device for causing deenergization of said electromagnetic means to release said brake, said device being actuated automatically during the independent movement of said motor in a direction to move the vehicle forwardly thereby effecting release of the brake before the power of said motor is applied to said rotary part.

13. In an automotive vehicle having a driving motor, the combination of retarding means for arresting the motion of said vehicle, a rotary device interposed between said motor and the driving wheel of said vehicle and adapted for limited angular movement independently of said wheel upon the initial application of power by said motor in a direction to drive the vehicle forwardly, electromagnetic means governing the action of said retarding means, and means actuated by said device and operable in such limited angular movement to control said electromagnetic means to render said retarding means ineffectual.

14. A braking system for an automotive vehicle having a driving motor and a rotary driving connection between said motor and driving wheel allowing for some degree of angular movement of said motor relative to said wheel by reason of the back-lash in said connection, said system including a brake associated with a rotary part of said vehicle remote from said motor, a device associated with said connection at a point adjacent said motor, and means for effecting automatic release of said brake arranged to be actuated by said device during the independent movement of said motor in a direction to drive the vehicle forwardly.

15. An electric braking system for a vehicle having, in combination, friction braking means, an electromagnetically controlled operator for said braking means adapted to derive an actuating force from the momentum of said vehicle, and automatically operating means controlling said operator to apply the brake and prevent unintentional retrograde motion of the vehicle and to release the brake to permit self-propulsion of the vehicle forwardly.

16. An electric braking system for a vehicle having, in combination, a brake, a pair of co-acting friction elements one movable with said vehicle, the other being arranged to actuate said brake upon movement away from a normal brake-released position, electromagnetic means adapted when energized to cause gripping engagement of said elements whereby to apply said brake, and means controlling the energization of said electromagnetic means and acting automatically to apply said brake and prevent retrograde motion of said vehicle and to release said brake when the vehicle is propelled forwardly.

17. In a braking system for an automotive vehicle having a motor and a driving connection between said motor and a wheel of the vehicle including a member which rotates in opposite directions during backward and forward movement of the vehicle, the combination of retarding means for arresting motion of the vehicle, an operator for said retarding means adapted to derive an actuating force from the backward motion of the vehicle but permitting of some degree of forward movement of said wheel after such actuation and while the operator is conditioned for application of said retarding means, and means for releasing said retarding means arranged to be operated automatically from said rotary member during the initial movement thereof in a direction to move the vehicle forwardly following application of the retarding means by backward movement of the vehicle.

18. In an electric braking system for a self-propelled automotive vehicle having a driving motor, the combination of a brake associated with a rotary part of said vehicle, electromagnetic means adapted when energized to cause application of said brake, a driving connection between said motor and a wheel of the vehicle including a rotary member adapted for a limited degree of angular movement in one direction while said electromagnetic means remains energized following application of the brake to arrest backward motion of the vehicle, and means operable automatically to interrupt the energizing circuit for said electromagnetic means as an incident to the independent angular movement of said member when motive power is applied thereto in a direction to move the vehicle forwardly whereby to initiate movement of said vehicle without moving the same against the action of said brake.

19. An electric braking system for an automotive vehicle combining retarding means for arresting retrograde motion of said vehicle, electromagnetic means adapted to apply said retarding means when energized and to release the same when deenergized, an energizing circuit for said electromagnetic means having a switch therein, means operable to detect backward motion of said vehicle and to close said switch in response to such motion whereby to apply said retarding means, a device arranged for manipulation of the vehicle driver to condition said vehicle for self-propulsion rearwardly, and means actuated by said device to prevent closure of said switch by said detecting means or to cause said switch to be opened in the event that the switch has been closed prior to the manipulation of said device.

20. An electric braking system for an automotive vehicle combining retarding means for arresting motion of said vehicle, electromagnetic means adapted to apply said retarding means when energized and to release the same when deenergized, an energizing circuit for said electromagnetic means, a device tending at all times during rearward motion of said vehicle to close said circuit and thereby apply said retarding means, a member arranged for manipulation by the vehicle driver to condition said vehicle for self-propulsion rearwardly, and means actuated by said member and operable to obstruct said device and thereby prevent the movement thereof in a direction to close said switch when the vehicle is conditioned for self-propulsion rearwardly.

21. An electric braking system for an automotive vehicle combining retarding means for arresting motion of said vehicle, electromagnetic means adapted to apply said retarding means when energized and to release the same when deenergized, an energizing circuit for said electromagnetic means having a switch therein, a rotary member permanently connected to one of the vehicle wheels so as to move in opposite directions during forward and backward movement of the vehicle, a device arranged to engage a friction surface on said member and adapted during rearward movement of the vehicle to be moved in a direction to close said switch, and means operable as an incident to the conditioning of the vehicle for self-propulsion rearwardly to overcome the frictional force tending to move said device to switch-closing position.

22. In an automotive vehicle having a driving motor and a device shiftable into different positions to determine the direction of movement of the vehicle by said motor, the combination of an electromagnetic brake, an energizing circuit therefor including a switch, and means operated by movement of said device into a position to cause reverse movement of the vehicle and adapted to open said switch and maintain the same open so long as said device remains in said last mentioned position.

23. In an automotive vehicle having a driving motor and a device shiftable into different positions to determine the direction of movement of the vehicle by said motor, the combination of an electromagnetic brake, an energizing circuit therefor including a switch, a member frictionally driven by a rotary part of said vehicle and adapted to be moved in a direction to effect closure of said switch upon rearward movement of said vehicle, and a stop adapted to be projected into the path of movement of said member by movement of said device into a position to cause rearward movement of the vehicle whereby to prevent closure of said switch by said member.

24. In an automotive vehicle, the combination of a driving motor, a transmission gearing for determining the direction of movement of the vehicle by said motor, a casing enclosing said gearing, a lever extending into said casing and shiftable selectively into different positions to control said gearing, an electromagnetic brake for the vehicle, an energizing circuit for said brake including a switch, and a rod controlling the actuation of said switch, said rod extending through said casing and arranged to be projected outwardly therefrom in the movement of said lever to condition the vehicle for propulsion rearwardly.

25. An electric braking system for an automotive vehicle providing an electromagnetic brake, an energizing circuit therefor, a member which moves in opposite directions during forward and rearward movement of said vehicle, means frictionally driven from said member and operable automatically upon unintentional rearward movement of the vehicle to close said circuit and thereby apply said brake, and means actuated automatically as an incident to the conditioning of the vehicle for self-propulsion rearwardly and operable to maintain said circuit open regardless of the condition of the circuit at the time when the vehicle is conditioned for such rearward movement.

26. An automatic braking system for arresting retrograde motion of an automotive vehicle having a motor and a rotary driving connection between said motor and a wheel of said vehicle, said system comprising a brake, electromagnetic means adapted to apply said brake when energized and to cause release of the brake when deenergized, and means deriving actuating power from said connection for causing energization of said electromagnetic means upon retrograde motion of said vehicle and deenergization thereof upon the application of motive power to said connection in a direction to drive the vehicle forwardly.

27. An automatic braking system for arresting retrograde motion of an automotive vehicle having a motor and a propeller shaft for transmitting motive power to one of the vehicle wheels, said system comprising, in combination, retarding means, electromagnetic means controlling the application and release of said retarding means, an energizing circuit, a switch controlling said circuit, an actuating member for said switch having a limited range of movement and movable in opposite directions to cause said switch to be opened and closed respectively, and means for actuating said member including an element rotatable with the propeller shaft of said vehicle and adapted for frictional engagement with said member so as to close said switch upon retrograde motion of said vehicle and to open the switch in the subsequent reverse movement of said shaft.

28. An automatic braking system for arresting retrograde motion of a vehicle having a motor and a connection between said motor and a wheel of the vehicle, said connection including a shaft adapted for limited angular movement relative to said wheel during the initial application of motive power thereto in a direction to drive the vehicle forwardly, said system including a brake immediately associated with one of the vehicle wheels, and means controlling the release of said brake and arranged to be actuated automatically from said shaft during said independent angular movement whereby to free said wheel for rotation prior to the application of motive power thereto.

29. An electric braking system for an automotive vehicle having a motor and a mechanical driving connection between said motor and a wheel of the vehicle, said system comprising, in combination, means for exerting a retarding action on the vehicle to prevent retrograde motion thereof, electromagnetic means controlling the operation of said retarding means, and means for effecting the deenergization of said electromagnetic means to release said retarding means, said last mentioned means being operated from said mechanical connection at a point adjacent said motor and during the angular movement at such point while the back-lash in said connection is being taken up by the application of motive power in a direction to move the vehicle forwardly.

30. In an automotive vehicle having a motor for driving a shaft connected to one of the vehicle wheels, the combination of a retarding means for arresting backward motion of said vehicle by applying a braking force to a rotary part of the vehicle located at a point remote from said motor, electromagnetic means adapted when energized to cause said retarding means to be applied and when deenergized to effect the release of the retarding means, and means actuated from the power driving shaft of the vehicle at a point adjacent said motor and operable automatically to cause deenergization of said electromagnetic means upon the application of motive power to said shaft in a direction to drive it forwardly.

31. In combination with a self-propelled automotive vehicle, an electric brake for said vehicle, and means automatically operable by the power transmitting connection between the motor of the vehicle and the driving wheels to control an energizing circuit for said brake and thereby apply said brake upon retrograde motion of the vehicle.

32. In combination with a self-propelled automotive vehicle, an electric brake for said vehicle, and means automatically operable by the power transmitting connection between the motor of the vehicle and the driving wheels to control an energizing circuit for said brake and thereby apply said brake upon retrograde motion of the vehicle, and also automatically operable by said connection in the initial movement thereof in a forward direction to recondition said circuit and thereby release said brake before the back-lash in said connection is taken up.

33. An electric braking system for a self-propelled automotive vehicle comprising, in combination, a brake, electromagnetic means controlling the application and release of said brake, manually operable means for controlling the energization and deenergization of said electromagnetic means to arrest either forward or backward movement of the vehicle, and automatically operable means arranged to cause energization of said electromagnetic means upon retrograde motion of said vehicle and deenergization thereof upon the subsequent application of motive power to said vehicle in a direction to propel the same forwardly.

34. An electric braking system for an automotive vehicle comprising, in combination, a friction brake for exerting a retarding action on a rotary part of said vehicle, a pair of coacting friction elements, one rotatable during motion of the vehicle, the other being movable by said rotatable element in either direction away from a normal brake released position and adapted in such movement to apply said brake, electromagnetic means controlling the gripping engagement of said elements, and two independent means controlling the energization of said electromagnetic means, one adapted for manual control by the vehicle driver, said other control means being operable automatically to cause energization of said electromagnetic means upon unintentional retrograde motion of said vehicle and to cause deenergization of the electromagnetic means upon the subsequent application of motive power to the vehicle in a direction to move the same forwardly.

35. In an automotive vehicle, the combination of a friction brake adapted when applied to arrest either forward or backward movement of said vehicle, electromagnetic means governing the action of said brake, and automatically operating means controlling the energization of said electromagnetic means to prevent unintentional retrograde motion of the vehicle and the subsequent deenergization of the electromagnetic means to permit propulsion of the vehicle without moving the same against the action of said brake.

36. In an automotive vehicle having a driving motor, the combination of an electromagnetically controlled brake for arresting backward motion of said vehicle, means providing a circuit for controlling the energization and deenergization of said brake, and means controlling said circuit automatically to effect application of said brake upon retrograde motion of said vehicle and release of the brake upon the application of power from said motor to said vehicle in a direction to propel the vehicle forwardly.

37. In an automotive vehicle having a driving motor, the combination of a brake adapted to arrest backward motion of said vehicle, electromagnetic means governing the action of said brake, and a single means operable automatically to establish an energizing circuit for said electromagnetic means upon retrograde motion of said vehicle and to interrupt said circuit and thereby release said brake automatically upon the application of power from said motor to said vehicle in a direction to move the vehicle forwardly.

38. An electric braking system for an automotive vehicle having, in combination, an electrically controlled friction brake adapted when energized to exert a retarded action on the vehicle in either direction of movement of the latter, a switch controlling the energization of said brake, and means responsive to initial retrograde motion of the vehicle to close said switch and then maintain the same closed during the forward throw of the vehicle body due to the normal recoil of the vehicle springs.

JOHN WHYTE.